United States Patent
Slingerland et al.

(10) Patent No.: US 12,155,288 B2
(45) Date of Patent: Nov. 26, 2024

(54) ELECTRIC MOTOR/GENERATOR, VEHICLE AND WIND TURBINE

(71) Applicant: ATLAS TECHNOLOGIES HOLDING B.V., Helmond (NL)

(72) Inventors: Hendrik Nicolaas Slingerland, Venlo (NL); Wouter Lukas Jansen, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 249 days.

(21) Appl. No.: 17/634,456

(22) PCT Filed: Aug. 13, 2020

(86) PCT No.: PCT/EP2020/072778
§ 371 (c)(1),
(2) Date: Feb. 10, 2022

(87) PCT Pub. No.: WO2021/028540
PCT Pub. Date: Feb. 18, 2021

(65) Prior Publication Data
US 2022/0278586 A1  Sep. 1, 2022

(30) Foreign Application Priority Data

Aug. 14, 2019 (NL) .......... 2023641
Nov. 6, 2019 (NL) .......... 2024173

(51) Int. Cl.
*H02K 5/173* (2006.01)
*B60K 7/00* (2006.01)
(Continued)

(52) U.S. Cl.
CPC ......... *H02K 5/1737* (2013.01); *B60K 7/0007* (2013.01); *F16C 32/0442* (2013.01); *H02K 1/2791* (2022.01); *H02K 7/088* (2013.01)

(58) Field of Classification Search
CPC .... H02K 5/1737; H02K 1/2791; H02K 7/088; H02K 5/10; H02K 5/1732; H02K 7/083;
(Continued)

(56) References Cited

U.S. PATENT DOCUMENTS

| 8,786,151 B1 | 7/2014 | Cole et al. |
| 2012/0262095 A1 | 10/2012 | Smith et al. |
| 2015/0145352 A1* | 5/2015 | Hein ............ H02K 7/088 |
| | | 310/90 |

FOREIGN PATENT DOCUMENTS

| EP | 3008795 A2 | 4/2016 |
| JP | H10225056 | * 8/1998 |

(Continued)

OTHER PUBLICATIONS

Netherlands Search Report and Written Opinion dated Jun. 23, 2020 for Application No. NL2024173.
(Continued)

Primary Examiner — Ahmed Elnakib
(74) Attorney, Agent, or Firm — Patterson + Sheridan, LLP

(57) ABSTRACT

There is provided an electric motor/generator comprising a stator and a rotor. The stator has an outer perimeter. The rotor at least coaxially encloses the outer perimeter of the stator. The rotor is rotatable relative to the stator around a rotation axis. The rotor and the stator are separated by a flux bearing gap over which in working magnetic flux occurs. The rotor and the stator are separated by a protective gap. The protective gap is configured to close, during a deformation of the rotor, before the flux bearing gap closes, thereby avoiding closure of the flux bearing gap. The motor/generator is characterized in that the stator comprises a roller bearing and an axle. The roller bearing is coupled to the axle and rotatable around the axle. The axle is arranged (Continued)

Figure 1:
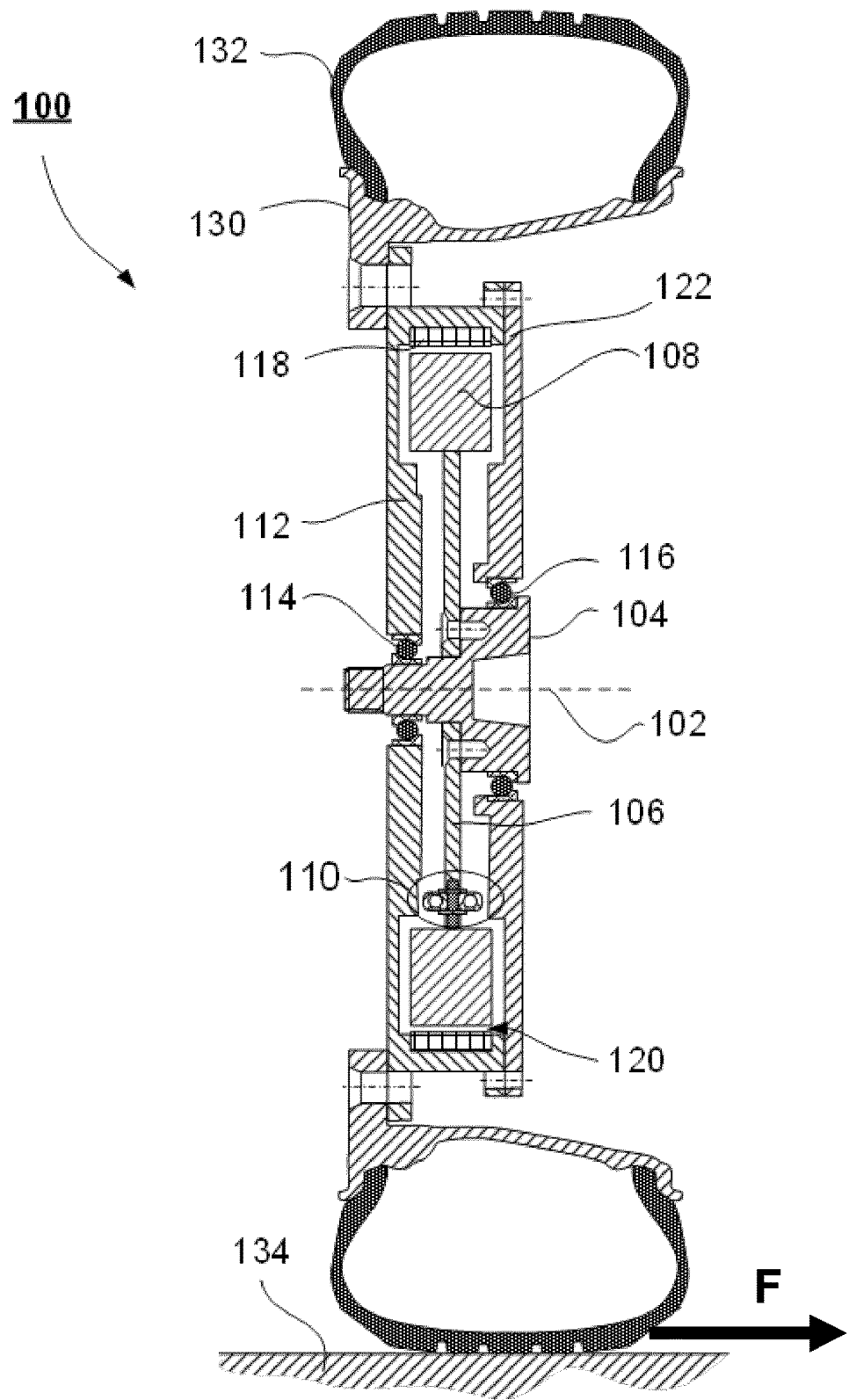

off-center from the rotation axis. A distance between the roller bearing and the rotor defines the protective gap.

14 Claims, 6 Drawing Sheets

(51) Int. Cl.
*F16C 32/04* (2006.01)
*H02K 1/2791* (2022.01)
*H02K 7/08* (2006.01)

(58) Field of Classification Search
CPC .... H02K 7/1846; H02K 5/173; B60K 7/0007; F16C 32/0442; F16C 39/02
USPC ........................................................ 310/90
See application file for complete search history.

(56) References Cited

FOREIGN PATENT DOCUMENTS

| | | | |
|---|---|---|---|
| JP | 2007-221881 | A | 8/2007 |
| JP | 2019-059347 | A | 4/2019 |
| JP | 2019059347 | * | 4/2019 |
| WO | 2008-127114 | A1 | 10/2008 |
| WO | 2014-199267 | A2 | 12/2014 |
| WO | 2014-199267 | A3 | 8/2015 |
| WO | 2017-141412 | A1 | 8/2017 |
| WO | 2018-010032 | A1 | 1/2018 |
| WO | 2019-151956 | A1 | 8/2019 |

OTHER PUBLICATIONS

Netherlands Search Report and Written Opinion dated Mar. 16, 2020 for Application No. NL2023641.

* cited by examiner

ELECTRIC MOTOR/GENERATOR, VEHICLE AND WIND TURBINE

The invention relates to an electric motor/generator comprising a stator and a rotor. The stator has an outer perimeter. The rotor at least coaxially encloses the outer perimeter of the stator. The rotor is rotatable relative to the stator around a rotation axis. The rotor and the stator are separated by a flux bearing gap over which in working magnetic flux occurs.

The invention further relates to vehicles and/or wind turbines equipped with such a motor/generator The project leading to this application has received funding from the European Union's Horizon 2020 research and innovation program under grant agreement No. 848620.

Such a motor is known from, e.g., Japanese patent application publication JP2014039461 (A), showing an Axial Flux Permanent Magnet (AFPM) motor.

The motor shows a stator having electromagnets on its outer perimeter, and a rotor surrounding the stator. The rotor shows permanent magnets on a radius equal to the radius where the electromagnets are placed. The rotor is carried on the stator by axial motor bearings. Electromagnets and permanent magnets are separated by two air gaps, one on each side of the stator. During operation of the motor, a magnetic flux occurs over the air gaps. The air gaps are therefore referred to as flux bearing gaps. When a rotating electric field is generated by the electromagnets, the attraction and repulsion of this electric field with respect to the permanent magnets induces a torque to the rotor.

Such a motor is used as, for example, an in-wheel motor in a vehicle, for example the Lightyear One, manufactured by Atlas Technologies, Helmond, the Netherlands.

Such a motor is known from international patent application publication WO2011045697 to Protean, showing a Radial Flux Permanent Magnet (RFPM) motor.

The motor shows a stator comprising electromagnets on its outer perimeter, and a rotor comprising permanent magnets. The rotor coaxially surrounds the stator. The rotor is mounted on the stator by axial motor bearings close to the center of the stator, enabling the rotor to rotate with respect to the stator.

The electromagnets and the permanent magnets are separated by an air gap over which, when the motor is working, magnetic flux occurs. The air gap is a radial gap, and is thus referred to as a radial flux bearing gap. The radial flux bearing gap separates the electromagnets and the permanent magnets.

The RFPM motor of WO2011045697 has only one flux bearing gap, whereas the AFPM motor of JP2014039461 has two flux bearing gaps.

A magnetic field is generated by the electromagnets. The magnetic field induces a torque on the rotor.

The flux bearing gap for a RFPM motor or an AFPM motor is typically rather small: for a diameter of approximately 30 cm (the typical diameter for the rotor of an in-wheel motor) a typical flux bearing gap of 1-2 mm is used.

The flux bearing gap separates electromagnets and permanent magnets. Permanent magnets are brittle, and the electromagnets are easily damaged as well. Especially the insulation of the wiring and the magnetic properties of the material of the yokes are easily damaged. Closure, even temporary closure, of the flux bearing gap typically leads to damage of the permanent magnets, electromagnets, or both.

It is noted that the motor may show other gaps as well. For a motor with a radial flux bearing gap, typically axial gaps are present. These axial gaps are non-flux bearing gaps, over which no or hardly any magnetic flux occurs during operation of the motor. There may be one axial gap at each side of the stator, between the stator and the rotor. For a motor with an axial flux bearing gap typically a radial gap is present. The radial gap may be radial outward of the stator, between the stator and the rotor. Such a radial gap is a non-flux bearing gap, over which no or hardly any magnetic flux occurs during operation of the motor. Closure of such an axial gap or radial gap is unwanted, as this may result in loss of power and efficiency and may generate particles due to abrasion. The particles are capable of damaging the flux bearing gap.

When applying the motor as an in-wheel motor in a vehicle, the rotor and the bearing connecting the rotor to the stator must be strong enough during normal radial load, e.g. to carry part of the weight of the vehicle. However, when cornering a vehicle or hitting a curb, large bending and tilting forces are exerted on the rotor. To avoid deformation, such as bending or tilting, of the rotor to such an extent that the flux bearing gap closes and damage to the motor occurs, typically the rotor and the bearings, which enable the rotor to rotate around the stator, are made much stiffer than needed for the radial load only. This implies a large mass and an expensive rotor. The same is true when using the motor in a wind turbine, where large forces are exerted on the blades of the turbine and thus the motor.

WO2011045697 to Protean describes a solution to the problem of the closing of the radial flux bearing gap by adding a protective radial gap that closes before the radial flux bearing gap closes. The protective radial gap showing a sliding bearing by adding a low friction coefficient material on at least one of its surfaces.

However, even when using low friction surfaces, non-negligible losses occur. Also, the coating is often a delicate coating, that easily damages, leading to even higher losses and wear of the coating. Also, particles can be generated due to abrasion, said particles possibly leading to damage of the permanent magnets and/or the electromagnets.

Another such a RFPM motor is known from international patent application publication WO2019/151956 to Elaphe.

WO2019/151956 proposes another solution to avoid closing of the radial flux bearing gap. It is recognized that closure of the radial flux bearing gap occurs when the axial gaps change. By limiting the change of an axial protective gap, the change of the radial flux bearing gap is limited as well. The axial gap is turned in a gliding bearing by coating the rotor and/or stator part of the protective gap with a low friction material, such as a coating with PTFE. However, even when using low friction surfaces, non-negligible losses occur. Also, the coating is often a delicate coating, that easily damages, leading to even higher losses and wear of the coating. Also, particles may be generated due to abrasion, said particles possibly leading to damage of the permanent magnets and/or the electromagnets There is a need for such motors with less massive rotors and less massive bearings, while still showing a robust control of the flux bearing gaps.

The invention intends to provide a solution to said limitation or at least to provide an alternative.

The goal of the invention is reached by providing an electric motor/generator comprising a stator and a rotor. The stator has an outer perimeter. The rotor at least coaxially encloses the outer perimeter of the stator. The rotor is rotatable relative to the stator around a rotation axis. The rotor and the stator are separated by a flux bearing gap over which in working magnetic flux occurs. The rotor and the stator are separated by a protective gap. The protective gap is configured to close, during a deformation of the rotor, before the flux bearing gap closes, thereby avoiding closure of the flux bearing gap. The electric motor/generator is characterized in that the stator comprises a roller bearing and an axle. The roller bearing is coupled to the axle and rotatable around the axle. The axle is arranged off-center from the rotation axis. A distance between the roller bearing and the rotor defines the protective gap.

By providing the roller bearing that defines, together with the rotor, the protective gap, the roller bearing comes into contact with the rotor when the rotor deforms. Because the roller bearing defines the protective gap, the roller bearing can be referred to as a protective bearing. By providing the axle off-center from the rotation axis, the axle and the roller bearing can be placed near the rotor. This allows the use of a small roller bearing that has less mass than a larger roller bearing. By providing the axle off-center from the rotation axis, the roller bearing is placed in a proper position and orientation at which the roller bearing is able to contact the rotor with only a minimum of friction between the roller bearing and the rotor. An advantage of providing the axle and the roller bearing to the stator is that the axle and the roller bearing do not rotate with the rotor. The axle and the roller bearing therefore do not influence the balancing of the rotor.

The invention is an electric motor/generator. An electric motor converts electric energy into kinetic energy, i.e., a rotation of the rotor. A generator converts kinetic energy, i.e., a rotation of the rotor, into electric energy. In an example, the invention is an electric motor that converts electric energy into kinetic energy to increase the rotation speed of the rotor. The electric energy is for example provided by a battery. When it is desired that the rotation speed of the rotor reduces, the invention works as a generator by reducing the rotational speed of the rotor. By reducing the rotational speed of the rotor, kinetic energy is transferred from the rotor to the generator. The generator converts the kinetic energy into electric energy. The electric energy is for example stored in the battery. In this example, the invention is able to switch between functioning as an electric motor and functioning as an electric generator. In another example, the invention functions only as an electric motor. In this example, the invention is able only to convert electric energy into rotation of the rotor. Decreasing the rotation speed of the rotor is for example done by using a brake system. In another example, the invention functions only as an electric generator. In this example, the invention is able only to convert kinetic energy of the rotation of the rotor into electric energy. In this example, the rotor is driven for example by wind power or hydro power or power generated by a combustion engine. In this example, the invention may comprise electronics that prevent that electric energy applied to the electric generator causes the rotor to rotate. In the text of this patent application below, the terms 'motor', 'generator', 'motor/generator', are all meant to indicate a device that is configured to convert electric energy to kinetic energy, or a device that is configured to convert kinetic energy to electric energy, or a device that is configured to convert electric energy to kinetic energy and that is configured to convert kinetic energy to electric energy.

The stator has an outer perimeter that is, for example, axisymmetric or rotational symmetric relative to the rotation axis. The outer perimeter is for example cylindrical shaped. In an example, the outer perimeter forms an outer surface of a main portion of the stator. In this example, some parts of the stator may radially extend beyond the outer perimeter.

The rotor at least coaxially encloses the outer perimeter of the stator. The rotor is for example cylindrically shaped and arranged coaxially around the stator. The cylindrically shape has two closed ends, two open ends or one open end and one closed end. The closed end is for example provided with an opening to receive electrical wires to connect electrical coils on the stator with an electric power source. The closed end, for example, seals an inner space of the rotor to prevent or reduce dirt or water to enter the inner space of the rotor. Dirt or water that enters the inner space of the rotor can potentially damage parts of the stator or parts of the rotor.

The rotor is rotatable relative to the stator around the rotation axis. The rotor and the stator are aligned relative to each other along the rotation axis. Preferably, the rotor and the stator are accurately aligned with each other along the rotation axis, to allow the flux bearing gap to be as small as possible, while preventing the rotor and the stator touching each other at the flux bearing gap. By providing a small flux bearing gap, a large magnetic flux can be generated at the flux bearing gap. The large magnetic flux increases the efficiency of the motor/generator.

The flux bearing gap is for example formed by a coil surface of a coil on the stator and a magnet surface of a magnet on the rotor. In another example, the stator comprises a coil and a core. The coil is arranged around the core. For example, the coil is wound around the core. The core extends radially outward towards the rotor. The core has a core end surface that faces the rotor. The core end surface forms one side of the flux bearing gap. The other side of the flux bearing gap is formed by a surface attached to the rotor. The surface is for example a surface of a magnet attached to the rotor. In another example, the rotor is provided with teeth made from a ferromagnetic material, such as iron. The teeth extend radially inward towards the stator. Each tooth has a tooth end surface that faces the stator. The tooth end surface forms the other side of the flux bearing gap. In another example, the rotor is provided with the teeth and with magnets. The teeth extend further radially inward than the magnets. A motor/generator is provided with a single flux bearing gap or with multiple flux bearing gaps.

The rotor and the stator are separated by a protective gap. The protective gap is a different gap between the rotor and the stator than the flux bearing gap. For example, the protective gap is adjacent to the flux bearing gap. In this example, the protective gap is smaller than the flux bearing gap, i.e., a distance between the rotor and the stator is smaller at the protective gap than at the flux bearing gap. When a deformation of the rotor occurs, the rotor may deform in a direction towards the stator. When the deforming part of the rotor reaches the stator, the rotor makes physical contact with the stator at the protective gap, because the protective gap is closer to the rotor than the flux bearing gap. Because of the physical contact with the stator at the protective gap, the stiffness of the stator prevents the rotor for deforming further. As a result, the rotor does not deform to the extent that the rotor contacts the stator at the flux bearing gap. Despite the deformation of the rotor, closure of the flux bearing gap is prevented. In addition to prevent closure of the flux bearing gap, closure of the protective gap may prevent closure of non-flux bearing gap.

In another example, the protective gap is at a distance from the flux bearing gap. In this example, the protective gap is larger or smaller than the flux bearing gap or is evenly large as the flux bearing gap. In an example, the protective gap is configured to protect the flux bearing gap during undesired rotation of the rotor relative to the stator perpendicular to the rotation axis. The undesired rotation of the rotor is an example of a deformation of the rotor. The center of the undesired rotation is for example determined by the location of the bearing that couples the rotor to the stator and/or by an external force applied to the rotor that causes the undesired rotation. When the protective gap is further from the center of the undesired rotation than the flux bearing gap, the protective gap may be larger than the flux bearing gap, but still closes due to the undesired rotation while the flux bearing gap remains open. Because of the larger distance from the center of the undesired rotation, the rotor moves more towards the stator for a certain angle of the undesired rotation at the protection gap than at the flux bearing gap.

The axle is arranged off-center from the rotation axis. For example, the axle is parallel to the rotation axis, but at an offset from the rotation axis. In another example, the axle is non-parallel to the rotation axis, such as perpendicular. By stating that the axle is arranged in a certain direction, reference is made to the axial direction of the axle. The axial direction of the axle is the direction about which the roller bearing rotates.

In an embodiment, the axle is arranged radially relative to the rotation axis.

By arranging the axle radially relative to the rotation axis, the roller bearing is able to rotate along a radial axis. This arrangement limits the friction between the rotor and the roller bearing when the protective gap is an axial gap. In an axial gap, the rotor and the roller bearing are spaced apart along an axial direction of the rotor over a distance that forms the protective gap. In case of a deformation of the rotor, an axial surface of the rotor contacts the roller bearing. Because the roller bearing is able to rotate along the radial axis, the roller bearing is able to rotate along with the axial surface of the rotor, and thus generates a minimum amount of friction between the rotor and the stator.

In an embodiment, the stator comprises electromagnets. The roller bearing is positioned between the rotation axis and the electromagnets.

For a motor, the electromagnets are preferably mounted radially outward on the stator as far as possible, so that the flux bearing gap is at the largest possible radius available in the motor. Having a flux bearing gap at the largest possible radius, gives the highest torque for a given diameter of the motor. By providing the roller bearing between the rotation axis and the electromagnets, the flux bearing gap can be arranged at the largest possible radius, while the protective gap prevents the flux bearing gap to close during a deformation of the rotor.

In an embodiment, the axle extends radially from the outer perimeter.

In this embodiment, the axle extends from the outer perimeter towards the rotor in a direction radial to the rotation axis. Because the roller bearing is coupled to the axle, the roller bearing is located radially outward of the outer perimeter of the stator. A deformation of the rotor that may typically occur, is that the rotor is undesirably rotated relative to the stator in a direction perpendicular to the rotation axis. This happens, for example, when an external force is applied to a side surface of the rotor at an offset with the rotation axis. Such an external force causes the rotor to rotate relative to the stator in a direction perpendicular to the rotation axis, wherein the center of rotation is near or at the rotation axis. The stiffness of the bearing that couples the rotor to the stator causes the center of rotation to be near or at the rotation axis. Because the center of rotation is near or at the rotation axis, the undesired rotation causes a displacement of the rotor relative to the stator that increases with the radial distance to the rotation axis. By placing the axle radially outward of the outer perimeter, the roller bearing is located at a location where the rotor displaces a large amount due to the undesired rotation. This allows the use of a large protection gap, while still preventing the flux bearing gap to close due to the undesired rotation. A large protection gap is more easy to make, because it requires less accuracy to make and assembly the motor/generator than if the protection gap is small.

In an embodiment, the protective gap is an axial gap.

The distance between the rotor and the stator in an axial direction of the rotor are small in some cases, for example, when the motor is an Axial Flux Permanent Magnet (AFPM) motor. In an AFPM motor, the flux bearing gap is an axial gap. In an example, the AFPM motor has two flux bearing gaps. The two flux bearing gaps are axial gaps on opposite sides of the stator along the rotation axis. The flux bearing gap is defined between a distance in the axial direction of the rotor between the rotor and the stator. To prevent the flux bearing gap to close due to a deformation of the rotor, the protective gap is arranged as an axial gap. The protective gap is for example arranged radially inward or radially outward of the flux bearing gap.

In an embodiment, the rotation axis is a horizontal axis and the axle is perpendicular to the horizontal axis and pointing to the horizontal axis.

In for example, an in-wheel motor, the rotor is used to drive a vehicle by rotating a wheel. In this example, the rotation axis is horizontal assuming the vehicle is on a horizontal plane. In for example a wind turbine, the rotation axis of the rotor is horizontal, such that the blades extending from the rotor move in a substantially vertical plane when the wind drives the wind turbine. By arranging the rotation axis horizontally, the blades of the wind turbine are able to receive more wind than, for example, the rotation axis would be vertical.

In an embodiment, the roller bearing is at or close to the lowest position of the stator.

In an in-wheel motor of a vehicle, the forces deforming the rotor often seize at the lowest point of the rotor, for example as a result of cornering or hitting the curb. It is then most effective to place the axle and roller bearing at or near the lowest position of the stator.

In an embodiment, the axle is parallel to the rotation axis and the protective gap is a radial gap.

In this embodiment, the protective gap is radially outward of the stator and radially inward of a part of the rotor. The protective gap closes if the rotor deforms, for example, in a radial direction relative to the rotation axis. In this example, the protective gap prevents a flux bearing gap that is a radial flux bearing gap to close due to the deformation of the rotor. The flux bearing gap is a radial gap, for example, in case the motor is a Radial Flux Permanent Magnet (RFPM) motor. In an RFPM motor, the electromagnets and the permanent magnets are arranged at different radial positions relative to each other. For example, the electromagnets are arranged on the stator and the permanent magnets are arranged on the rotor. The permanent magnets are arranged radially outward of the electromagnets. By providing the axle parallel to the rotation axis, the roller bearing is arranged to rotate along with a radial surface of the rotor in case the protective gap is closed due to deformation of the rotor. The friction force applied by the rotor on the roller bearing causes the roller bearing to rotate along the axle, thus minimizing the friction between the radial surface of the rotor and the roller bearing.

In an embodiment, the axle is a non-vertical axle pointing to the rotation axis.

In wind turbines, the forces deforming the rotor can occur at different orientations, as the forces are typically generated by wind gusts. Such wind gusts may deform the rotor by undesirably rotating the rotor around a vertical axis. By providing the axle as a non-vertical axle pointing to the rotation axis, the roller bearing is in a position to protect the flux bearing gap against the undesirably rotation of the rotor around the vertical axis.

In an embodiment, the roller bearing has an inner ring and an outer ring. The inner ring is connected to the axle. The outer ring has an outer lateral surface. A distance between the outer lateral surface and the rotor defines the protective gap.

The roller bearing has an inner ring and an outer ring. Rolling elements such as balls or rollers are arranged in between the inner ring and the outer ring. The inner ring is connected to the axle. For example, the inner ring is fixed to the axle, such that the inner ring is not moveable relative to the axle. The outer ring is rotatable relative to the inner ring along the axle. The outer ring has the outer lateral surface. The outer lateral surface is a curved surface that is arranged, for example, concentric with the axle. When the protective gap closes due to a deformation of the rotor, the rotor contacts the outer lateral surface of the outer ring. Because the outer lateral surface is the part of the outer ring that is radially at the largest distance from the axle, contact between the rotor and the outer lateral surface causes the outer ring to rotate with only a minimum of friction force between the rotor and the roller bearing. A small friction force multiplied by the large radial distance between the axle and the outer lateral surface creates enough torque to rotate the outer ring relative to the inner ring. Because a small friction force is enough to rotate the outer ring relative to the inner ring, no large friction force is generated between the rotor and the roller bearing. By preventing a large friction force, wear of the motor/generator and the creation of particles is reduced. In an example, the rotor and the outer ring are configured to contact each other when the protective gap is closed at a contact area. The rotor moves in a direction at least partly tangentially to the outer ring at the contact area. The roller bearing is arranged relative to the contact area such that the movement of the rotor at the contact area is at least partly tangential to the outer ring.

In an embodiment, the distance between the outer lateral surface and the rotor is in a radial direction relative to the axle.

In this embodiment, the protective gap is defined by a distance between the outer lateral surface and the rotor in a radial direction relative to the axle. So when the rotor deforms and closes the protective gap, the rotor deforms in a direction that is radial to the axle. As a result, when the rotor contacts the outer ring, the roller bearing only requires a minimum amount of friction force between the rotor and the outer ring to rotate the outer ring relative to the inner ring. As a result, the friction between the rotor and the roller bearing is reduced.

In an embodiment, the electric motor/generator comprises a plurality of roller bearings and a plurality of axles. Each of the plurality of roller bearings is rotatable around a corresponding one of the plurality of axles. The plurality of axles are arranged on the stator to define a plurality of protective gaps. Depending on the deformation of the rotor, one or more of the plurality of protective gaps are configured to close.

In this embodiment, there are multiple protective gaps. A plurality of sets of a roller bearing and an axle are formed. Each set of a roller bearing and an axle defines a protective gap between the roller bearing of the set and the rotor. The sets are distributed over the stator. For example, three sets are arranged on the stator at an angle of 120° with each other around the rotation axis. For example, four sets are arranged on the stator at an angle of 90° with each other around the rotation axis. For example, ten sets are arranged on the stator at an angle of 36° with each other around the rotation axis. The axles of the sets are for example arranged in the same way, for example, the axles are all arranged radially relative to the rotation axis or the axles are all arranged tangentially relative to the rotation axis. The axles of the sets are for example arranged in different ways, for example some axles are arranged radially relative to the rotation axis whereas some other axles are arranged tangentially relative to the rotation axis. Depending on the deformation of the rotor, the roller bearings of some sets contact the rotor. For example, when the lower part of the rotor deforms radially, one or more roller bearings at the lower part of the stator that define a radial protective gap contact the rotor. In another example, when an upper part of the rotor deforms axially, one or more roller bearings at the upper part of the stator that define an axial protective gap contact the rotor. For example, based on expected deformations of the rotor, the sets of axles and roller bearings are placed on specific location on the stator. The expected deformations may be based on the construction and/or stiffness of the motor/generator, and/or may be based on external forces that are expected to be applied to the rotor during operation use of the motor/generator.

In an embodiment, the roller bearings are bearings from the group of ball bearings, needle bearings, and cam rollers.

The roller bearings according to this embodiment are able to form the protective gap, without the disadvantages associated with a gliding bearing, such as abrasion. Also, friction of a roller bearing is typically much lower than the friction occurring in a gliding bearing. In case the protective gap is closed, the roller bearing dissipates less energy than the gliding bearing.

In an embodiment, there is provided a vehicle with a motor/generator, more specifically an in-wheel motor/generator as described in the embodiments above.

In a vehicle, the rotor of a motor/generator is often exposed to external forces that deform the rotor. The external forces are for example created by turning the vehicle at a high speed, driving over bumps such as the curb of a sidewalk or speedbumps, driving through potholes, or parking the vehicle against the curb. By providing the motor/generator as described in the embodiments above in a vehicle, a robust motor/generator is provided with a reduced weight.

In an embodiment, there is provided a wind turbine equipped with the motor/generator according to one of the embodiments described above.

The rotor of a wind turbine is subject to a large stress due to the weight of the blades that are attached to the rotor. Because the rotor is rotating, the weight of the blades create a change in the stress of the rotor. For example, when a blade is orientated vertically, the blade creates a different stress on the rotor then when the blade is orientated horizontally. The change in stress causes deformation of the rotor. In addition to the deformation caused by the blades, the wind causes further deformation of the rotor. Gusts of wind may cause a sudden force on one or more of the blades. The sudden force creates additional deformation of the rotor. Despite all these deformations of the rotor, the flux bearing gap of the wind turbine should be as small as possible to improve the efficiency of the wind turbine. By providing the wind turbine with a motor/generator according to the invention, a small flux bearing gap can be used. The flux bearing gap is protected from closure by the protective gap as described above.

Figure 2:
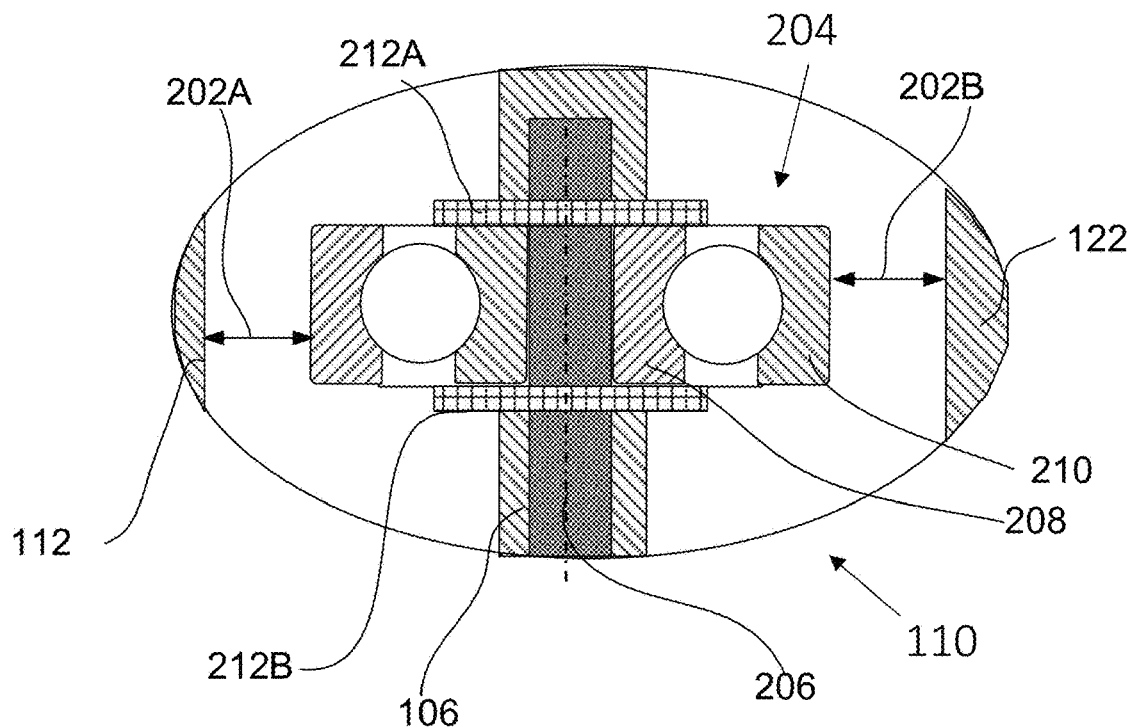
Figure 3:
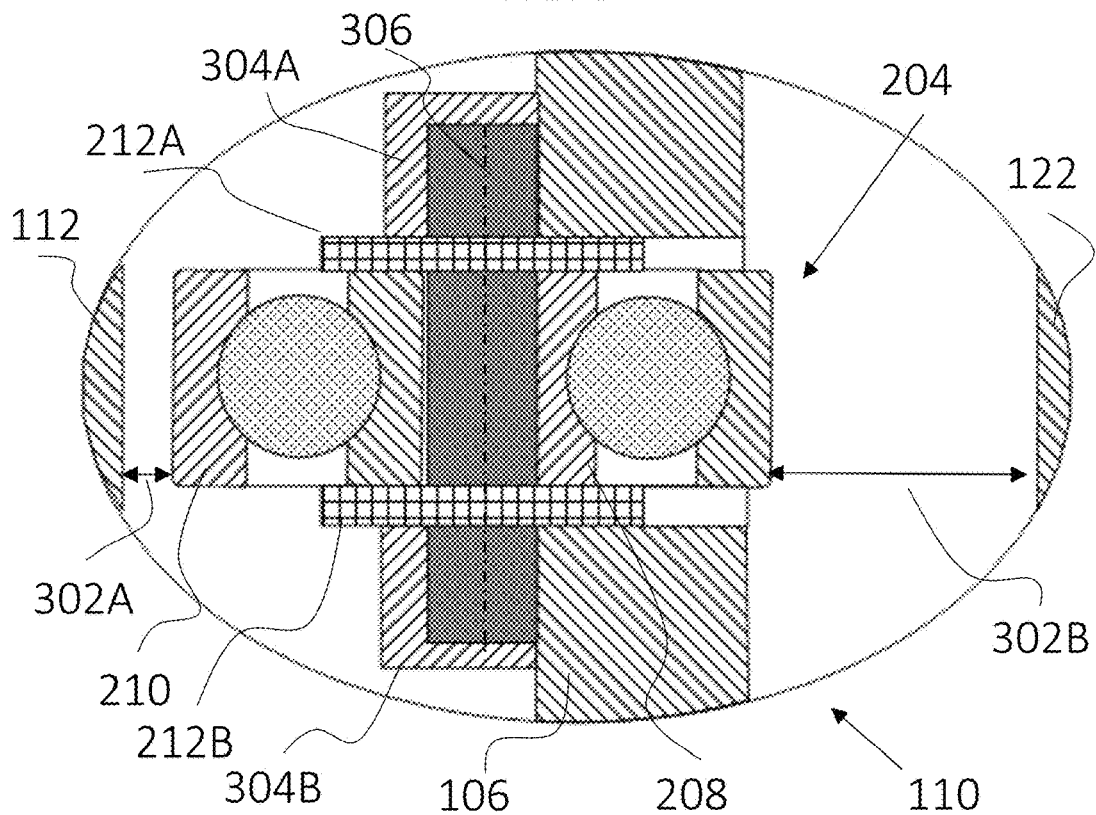

The invention will be described in more detail below under reference to the figures, in which in a non-limiting manner exemplary embodiments of the invention will be shown. The figures show in:

FIG. 1: schematically a first embodiment according to the invention,

FIG. 2: schematically a detail of the first embodiment,

FIG. 3: schematically a detail of a second embodiment of the invention

Figure 4:
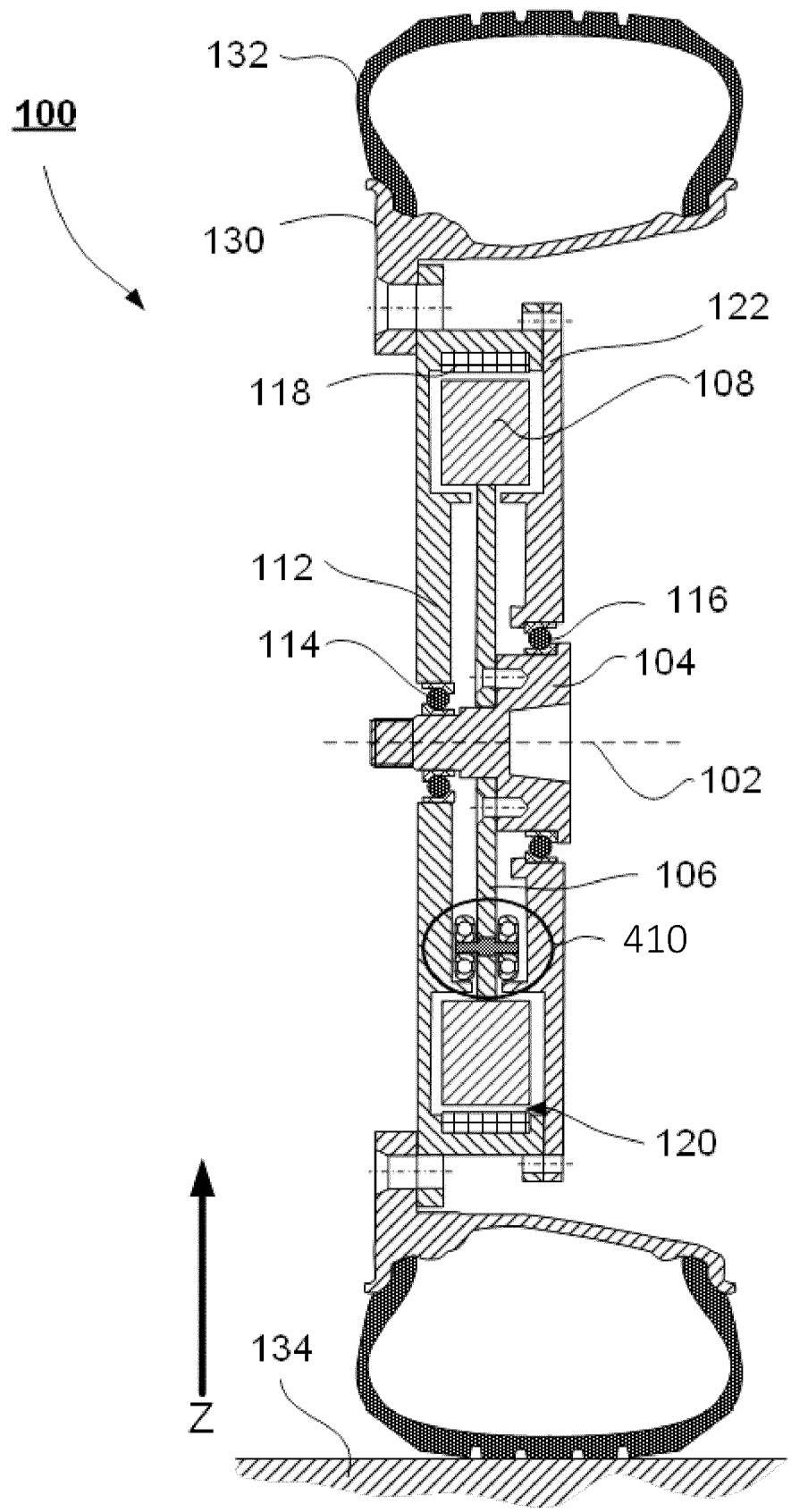
Figure 5:
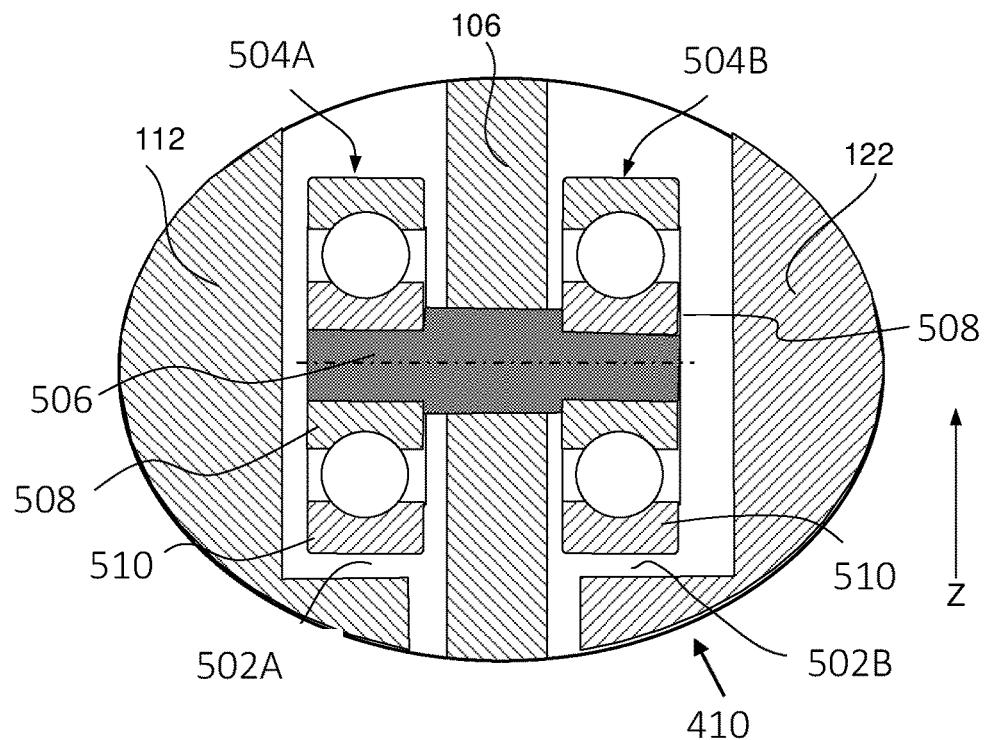
Figure 6:
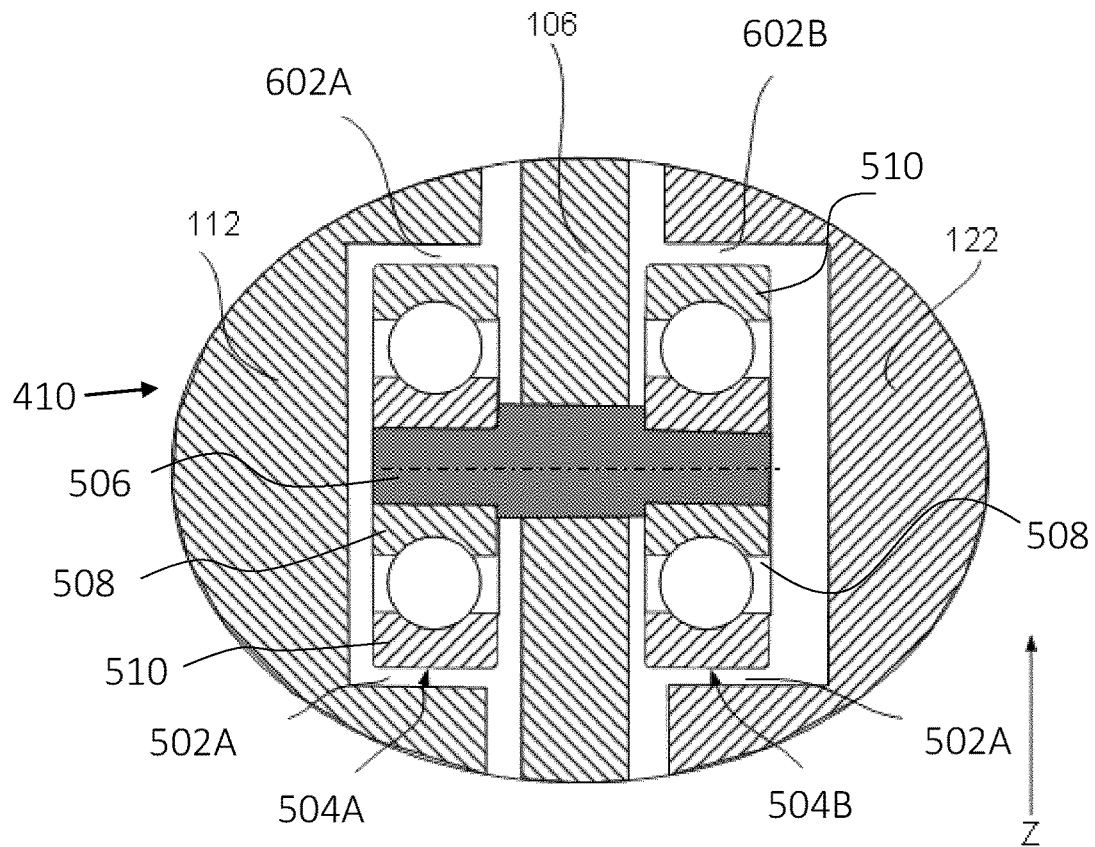
Figure 7:
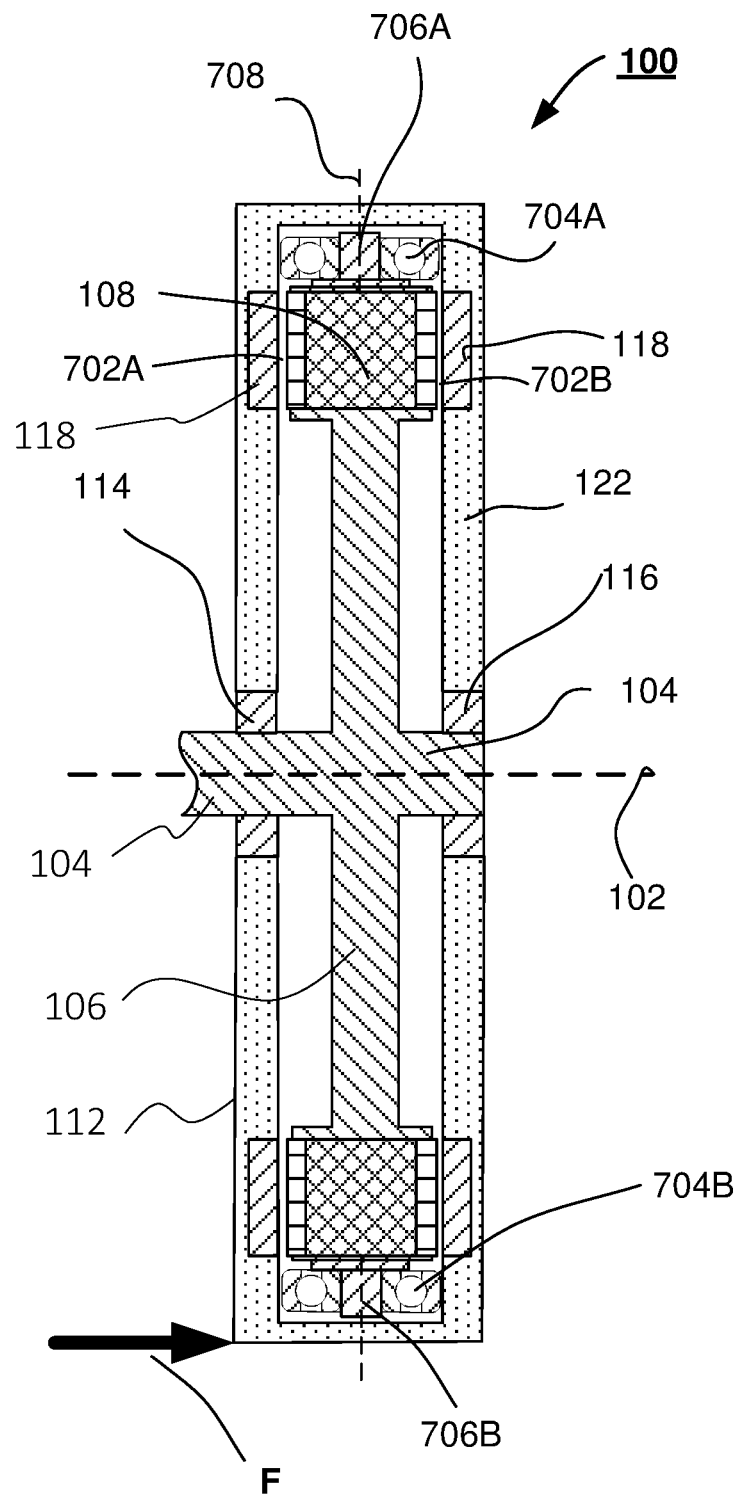
Figure 8:
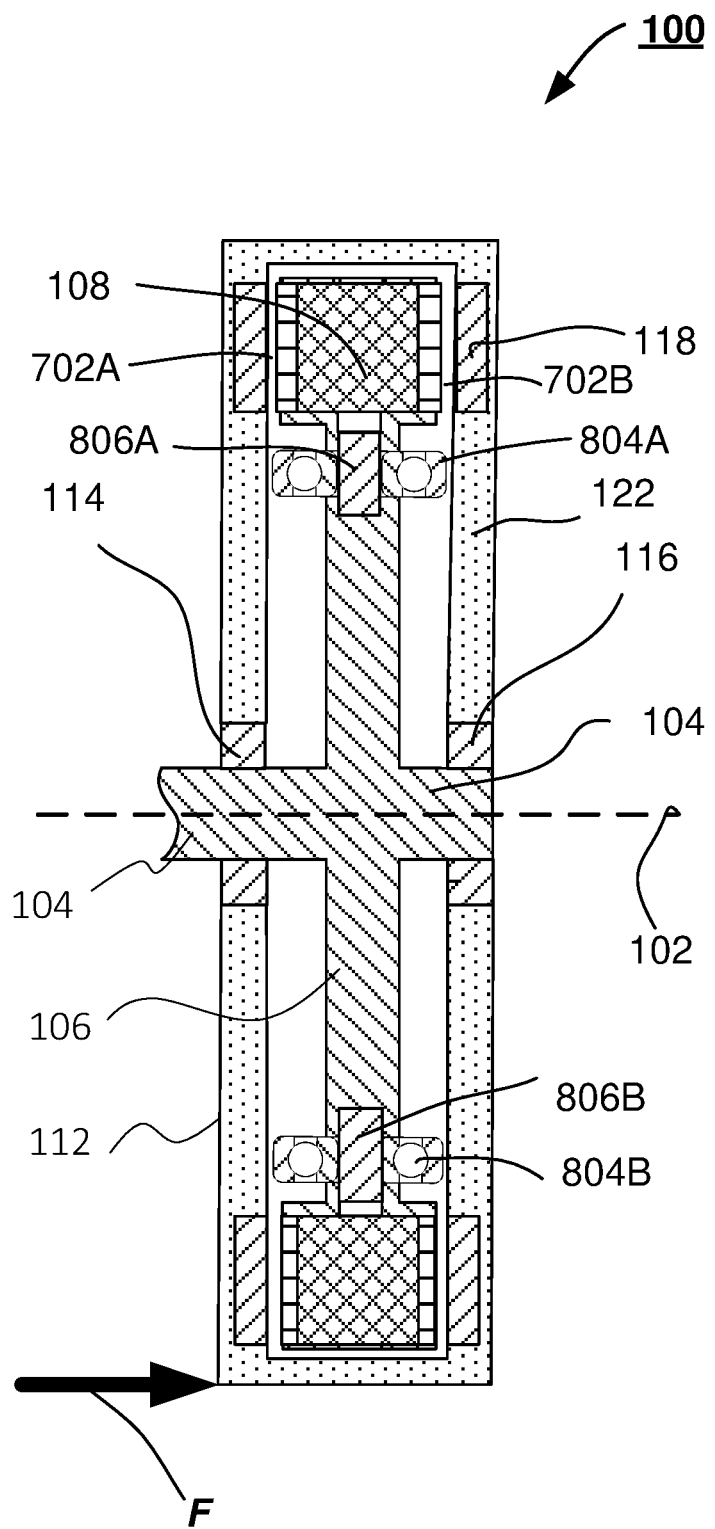

FIG. 4: schematically a third embodiment according to the invention,

FIG. 5: schematically a detail of the third embodiment,

FIG. 6: schematically a detail of a fourth embodiment according to the invention, FIG. 7: schematically a fifth embodiment according to the invention, FIG. 8: schematically a sixth embodiment according to the invention.

FIG. 1 shows a first embodiment according to the invention. The first embodiment is a Radial Flux Permanent Magnet (RFPM) motor. The invention is, however, not limited to only this type of motor. The invention is intended to cover any motor where a narrow flux bearing gap between rotor and stator exists, such as Axial Flux Permanent Magnet motors, reluctance motors and inductance motors.

FIG. 1 shows an electric motor 100 comprising a rotor 112, 122 and a stator 104, 106. The reference numbers 112 and 122 indicate two parts of the rotor 112, 122 that together enclose the stator 104, 106 and that together rotate relative to the stator 104, 106. The reference numbers 104 and 106 indicate two parts of the stator 104, 106 that are connected together. The rotor 112, 122 is rotationally mounted on the stator 104, 106 using axial motor bearings 114 and 116, enabling the rotor 112, 122 to rotate relative to the stator 104, 106 around rotation axis 102. The rotor 112, 122 comprises a multitude of permanent magnets 118. The stator 104, 106 comprises a number of electromagnets 108. The permanent magnets 118 of the rotor 112, 122 face the number of electromagnets 108 in the stator 104, 106. It is noted that the number of permanent magnets 118 typically differs from the number of electromagnets 108, but this need not be the case. Stator part 104 is the part of the stator onto which the axial motor bearings 114, 116 are arranged. Stator part 106 is connected to stator part 104 and supports the electromagnets 108. Rotor part 112 is the part of the rotor has holds the permanent magnets 118. Rotor part 122 is connected to the rotor part 112 to enclose the permanent magnets 118 and the electromagnets 108. By enclosing the permanent magnets 118 and the electromagnets 108, the rotor 112, 122 protects the permanent magnets 118 and the electromagnets 108 from dirt and water.

Between the permanent magnets 118 and the electromagnets 108, a flux bearing gap 120 exists. The flux bearing gap 120 is typically between 1-2 mm. The flux bearing gap 120 is a radial gap, extending radially between the stator 104, 106 and the rotor 112, 122. FIG. 1 further shows a gap retaining element 110, which is shown in more detail in FIG. 2.

The stator 106 comprises an outer perimeter. The outer perimeter is a most radial outward perimeter of the stator 106. The outer perimeter is formed by a radial outward surface of the electromagnets 108. The outer perimeter forms one side of the flux bearing gap 120.

In working, so during operational use of the motor, the electromagnets 112 induce a rotating magnetic field that interacts with the permanent magnets 118 over the flux bearing gap 120, resulting in a torque on the rotor 112, 122. When the motor 100 is a hub motor for a vehicle (i.e., an in-wheel motor), the motor 100 is surrounded by a rim 130 and a tire 132. When the vehicle corners or hits a curb, a force F grips at the patch between road 134 and tire 132. This force F tends to tilt or bend the rotor 112, 122. This in turn influences the size of the flux bearing gap 120 and other gaps.

The gap retaining element 110, see further in FIG. 2 comprises a roller bearing 204 that is attached to the stator 106 via an axle 206. The roller bearing 204 is used to create a protective gap 202A, 202B. The protective gap 202A, 202B is in an axial direction of the rotation axis 102 to protect the flux bearing gap 120 that is in the radial direction. So control of the axial protective gap 202A, 202B protects the radial flux bearing gap 120.

The gap retaining element 110 does not rotate together with the rotor 112, 122, because the gap retaining element 110 is connected to the stator 104, 106. Therefore, the gap retaining element 110 has no effect on the balancing of the motor.

Because the force F grips at the patch between road 134 and tire 132, a preferred position of the gap retaining element 110 is at the lowest position of the stator 104, 106. The lowest position of the stator 104, 106 is as close as possible to the location where the force F is applied to the tire 132. A limitation is that it is preferred to place the electromagnets 108 and the permanent magnets 118 as far removed from the rotation axis 102 as possible to create the largest amount of torque with the motor 100. Therefore, the gap retaining element 110 is placed at the lowest position of the stator 104, 106 just radially inward of the electromagnets 108.

It is worth mentioning that the gap retaining element 110 not only limits the direct effect (tilt and bending) of, for example, cornering, but also the effect of vibration of rotor 112, 122 and/or stator 104, 106. To limit vibrations, the gap retaining element 110 may be equally effective at other (tangential) positions on the stator 104, 106.

FIG. 2 schematically shows a detail of first embodiment. The detail is focused around the gap retaining element 110.

FIG. 2 shows a gap retaining element 110 comprising a ball bearing, which is an example of a roller bearing 204. The roller bearing 204 comprises an inner ring 208 and an outer ring 210. An axle 206 is inserted in a bore in the stator 106. The axle 206 is connected to the stator 106. The axle 206 is arranged radially relative to the rotation axis 102. Because the axle 206 is arranged radially relative to the rotation axis 102, the axle 206 is arranged off-center from the rotation axis 102. The axle 206 is arranged off-center from the rotation axis 102, because the direction of the axle 206 does not align with the direction of the rotation axis 102. Two spacers 212A, 212B are placed on the axle 206 on opposite sides of the inner ring 208 to keep the outer ring 210 free from the stator 106. The two spacers 212A, 212B prevent an axial surface of the outer ring 210 from contacting the stator 106. If the inner ring 208 is slightly longer than the outer ring 210, these spacers 212A, 212B might be superfluous.

The roller bearing 204 is preferably placed in a more or less rectangular slot in the stator 106. The axle 206 may be inserted in a bore that is drilled in the stator 106 before the electromagnets 108 are mounted on the stator 106. The axle 206 is arranged radial relative to the rotation axis 102 and is pointed at the rotation axis 102.

Between the outer ring 210 and the rotor parts 112, 122, protective gaps 202A and 202B exist. The protective gaps 202A and 202B are in an axial direction of the rotor 112, 122, i.e., in a direction parallel to the rotation axis 102. The protective gaps 202A and 202B are thus axial gaps. When the rotor 112, 122 bends or tilts, one of these protective gaps 202A, 202B will close and the rotor 112, 122 will roll over the outer ring 210. The force that is then exerted on the roller bearing 204 may bend or tilt the stator 106 together with the rotor 112, 122 in case the stator 106 is not stiff in the axial direction, or the stator 106 may stiffen the rotor 112, 122 sufficiently to limit further deformation.

As is shown in FIG. 2, the inner ring 208 is connected to the axle 206. The outer ring 210 has an outer lateral surface. The protective gap 202A is defined by a distance between the outer lateral surface of the outer ring 210 and the rotor 112. The protective gap 202B is defined by a distance between the outer lateral surface of the outer ring 210 and the rotor 122.

In an example, the rotation axis 102 is a horizontal axis and the axle 206 is perpendicular to the horizontal axis and pointing to the horizontal axis. The axle 206 is for example arranged vertically and pointing to the rotation axis 102. In another example, the axle 206 is pointing to the rotation axis and is non-vertical, for example horizontal or at an angle of larger than 0° and smaller than 90° with a horizontal plane.

In this embodiment, a ball bearing is discussed, but instead a different type of roller bearing 204 such as a needle roller bearing, a cylinder bearing and the like can be used.

FIG. 3 schematically shows a detail of a second embodiment of the invention. The detail focusses around the gap retaining element 110. The detail of the second embodiment can be implemented in the motor as shown in FIG. 1. The detail of the second embodiment is the same as the detail of the first embodiment, except for what is disclosed below.

FIG. 3 shows a gap retaining element 110 comprising a roller bearing 204 and an axle 306 that is not inserted in the stator 106 but instead mounted on the stator 106. Caps 304A, 304B keep the axle 306 and the roller bearing 204 in place. The caps 304A, 304B can be mounted to the stator 106 using screws, or by (spot)welding. A closure of the protective gap 302A results in a force by the rotor 112 to the outer ring 210 of the roller bearing 204.

This gap retaining element 110 for example protects only one protective gap 302A. Because the axle 306 is arranged on a side surface of the stator 106, the protective gap 302A is smaller than the protective gap 302B. In an embodiment, a second gap retaining element 110 is placed on the opposite side of the stator 106, i.e., on the right side of the stator 106 in the FIG. 3. The second gap retaining element 110 defines the protective gap 302B with the rotor 122. In an embodiment, a single gap retaining element 110 defines both the protective gap 302A and the protective gap 302B. In that embodiment, the protective gap 302B is larger than the protective gap 302A.

As is shown in FIG. 3, the inner ring 208 is connected to the axle 306. The outer ring 210 has an outer lateral surface. The protective gap 302A is defined by a distance between the outer lateral surface of the outer ring 210 and the rotor 112. The protective gap 302B is defined by a distance between the outer lateral surface of the outer ring 210 and the rotor 122.

FIG. 4 schematically shows a motor 100 according to a third embodiment of the invention. The third embodiment is the same as the first embodiment as disclosed in FIG. 1, except for the following.

FIG. 4 shows a gap retaining element 410. The gap retaining element 410 is coupled to the stator 106. The gap retaining element 410 is arranged on the stator 106 between the rotation axis 102 and the electromagnets 108. The electromagnets 108 are radially outward of the gap retaining element 410 relative to the rotation axis 102. The gap retaining element 410 is configured to protect a radial flux bearing gap 120 against deformation of the rotor 112, 122 in the z-direction, i.e. the radial direction relative to the rotation axis 102. The deformation of the rotor 112, 122 in the z-direction occurs, for example, when the vehicle to which the motor 100 is attached, drives over a bump or a pothole in the road.

FIG. 5 schematically shows a detail of the third embodiment. The detail focusses around the gap retaining element 410 used in FIG. 4.

FIG. 5 shows two roller bearings 504A and 504B mounted on a common axle 506. The axle 506 protrudes through the stator element 106. The axle 506 is parallel to the rotational axis 102, i.e., the axle 506 is in an axial direction of the rotor 112, 122. Each of the two roller bearings 504A, 504B have an inner ring 508 and an outer ring 510. Protective gap 502A is between roller bearing 504A and rotor part 112. Protective gap 502B is between the roller bearing 504B and the rotor part 122. The rotor part 112 has a protrusion that extends in the axial direction to create the protective gap 502A between the protrusion and the outer lateral surface of the roller bearing 504A. The rotor part 122 has a protrusion that extends in the axial direction to create the protective gap 502B between the protrusion and the outer lateral surface of the roller bearing 504B. One or both of the protective gaps 502A, 502B close when the rotor 112, 122 deforms in the z-direction and thereby protects a radial flux bearing gap 120.

The axle 506 has a thickened part in the middle that is thicker than the part at the ends of the axle 506 on which the inner rings 508 of the bearings 504A, 504B are mounted. By providing the axle 506 with the thickened part in the middle, the spacers 212A, 212B as shown in FIG. 2 are superfluous. Thickened part in the middle is configured to prevent an axial surface of the outer rings 510 of the roller bearings 504A, 504B to touch the stator 106.

The axle 506 is arranged parallel to the rotational axis 102 and at an offset relative to the rotation axis 102. Because the axle 506 is at an offset relative to the rotation axis 102, the axle 506 is arranged off-center from the rotation axis 102. The axle 506 is arranged off-center from the rotation axis 102, because the axle 506 does not align with the rotation axis 102.

FIG. 6 schematically shows a detail of a fourth embodiment according to the invention. The detail focusses around the gap retaining element 410 as shown in FIG. 4. The fourth embodiment is the same as the third embodiment as disclosed in FIGS. 4 and 5, except for the following.

FIG. 6 shows that the rotor parts 112 and 122 have a slightly different form than the rotor parts 112 and 122 in FIG. 5. The rotor parts 112 and 122 form an annular chamber in which the roller bearings 504A and 504B are positioned. As a results thereof not two (502A and 502B), but four protective gaps (502A, 502B, 602A and 602B) are present. When the rotor 112, 122 deforms in the positive z-direction, the protective gaps 502A and 502B are closed. When the rotor 112, 122 deforms in the negative z-direction, the protective gaps 602A and 602B are closed. By providing two roller bearings 504A, 504B, the forces by the rotor 112, 122 on each roller bearing 504A, 504B is reduced compared to having only one roller bearing.

As shown in FIG. 6 the roller bearings 504A, 504B each have an inner ring 508 and an outer ring 510. The inner rings 508 are connected to the axle 506. The outer rings 510 each have an outer lateral surface. A distance between the outer lateral surface and the rotor 112, 122 defines the protective gaps 506A, 506B, 606A, 606B. The distance between each of the outer lateral surfaces and the rotor is in a radial direction relative to the axle 506.

FIG. 7 schematically discloses a fifth embodiment according to the invention. FIG. 7 shows an electric motor 100 that is an Axial Flux Permanent Magnet (AFPM) motor. The rotor 112, 122 is rotationally mounted on the stator 104 using axial motor bearings 114 and 116. The rotor 112, 122 is configured to rotate relative to the stator 104, 106 around the rotation axis 102. The rotor 112, 122 is provided with a multitude of permanent magnets 118, which face a number of electromagnets 108 in the stator 106. The number of permanent magnets 118 may differ from the number of electromagnets 108. The permanent magnets 118 and the electromagnets 108 are spaced by two air gaps. The two air gaps are flux bearing gaps 702A and 702B. During operational use of the motor 100, the electromagnets 108 generate a magnetic field that cooperates with the magnetic field of the permanent magnets 118 to generate a torque to rotate the rotor 112, 122 relative to the stator 104, 106 around the rotation axis 102. During operational use of the motor 100, magnetic flux is guided over the flux bearing gaps 702A, 702B.

When an external force F is exerted on the rotor 112, a torque is introduced to the rotor 112 that causes the rotor 112, 122 to deform. The torque rotates to rotor 112, 122 around an axis perpendicular to the rotation axis 102. When the motor 100 is a hub motor (i.e., an in-wheel motor) for a vehicle, the motor 100 is surrounded by a rim and a tire. Force F can be the result of cornering the vehicle, or driving the vehicle over the curb of the road. The flux bearing gaps for such a motor are typically between 1-2 mm.

At the lowest point of the stator 106, an axle 706B is attached to the stator 104, 106. The axle 706B extends radially from the outer perimeter of the stator 106. A roller bearing 704B is attached to the axle 706B. The roller bearing 706B is rotatable relative to the axle 706B around axis 708. The axis 708 is in a radial direction relative to the rotation axis 102. The roller bearing 704B has an outer ring that has an outer lateral surface. The gap in the axial direction of the rotor 112, 122 between the outer lateral of the roller bearing 704B and the rotor 112, 122 forms a protective gap. The protective gap is smaller than the flux bearing gap 702A or 702B.

Likewise, at the highest point of the stator 106, an axle 706A is attached to the stator. The axle 706A extends radially from the outer perimeter of the stator 106. A roller bearing 704A is attached to the axle 706A. The roller bearing 706A is rotatable relative to the axle 706A around axis 708. The axis 708 is in a radial direction relative to the rotation axis 102. The roller bearing 704A has an outer ring that has an outer lateral surface. The gap in the axial direction of the rotor 112, 122 between the outer lateral of the roller bearing 704A and the rotor 112, 122 forms a protective gap. The protective gap is smaller than the flux bearing gap 702A or 702B.

Each of the roller bearings 704A and 704B have an inner ring and an outer ring. The inner ring is connected to the axle 706A or 706B respectively. The outer rings each have an outer lateral surface. A distance between the outer lateral surface and the rotor 112, 122 defines the protective gaps. The distance between the outer lateral surface and the rotor 112, 122 is in a radial direction relative to the axle 706A or 706B.

As shown in FIG. 7, the motor 100 comprises a plurality of roller bearings 704A, 704B and a plurality of axles 706A, 706B. Each of the plurality of roller bearings 704A, 704B is rotatable around a corresponding one of the plurality of axles 706A, 706B. Roller bearing 704A is rotatable around axle 706A. Roller bearing 704B is rotatable around axle 706B. The plurality of axles 706A, 706B are arranged on the stator 106 to define a plurality of protective gaps. Depending on the deformation of the rotor, one or more of the plurality of protective gaps are configured to close. A deformation in the upper part of the rotor 112, 122 closes the protective gap defined by the roller bearing 704A. A deformation in the lower part of the rotor 112, 122 closes the protective gap defined by the roller bearing 704B.

In an example, roller bearing 704A or 704B is replaced by a pair of roller bearings that are axially displaced. In that way, each of the pair defines one protective gap only. In an example, the stator 106 is extended in the axial direction of the rotor 112, 122 to provide sufficient space to place the pair of roller bearings that are axially displaced. The pair of roller bearings may, in addition to be displaced axially from each other, also be displaced angularly. This embodiment is especially attractive for thicker stators 106.

Although in this embodiment, two roller bearings 706A, 706B are used, one in the lower and one in the uppermost position, it is foreseen that only a roller bearing 706B in the lower position suffices. However, for wind turbines several roller bearings, displaced over, for example, 90 degrees, might be necessary.

The axles 706A and 706B are arranged radially relative to the rotation axis 102. Because the axles 706A and 706B are arranged radially relative to the rotation axis 102, the axles 706A and 706B are arranged off-center from the rotation axis 102. The axles 706A and 706B are arranged off-center from the rotation axis 102, because the direction of the axle 206 does not align with the direction of the rotation axis 102.

FIG. 8 shows schematically a sixth embodiment according to the invention. The sixth embodiment is the same as the fifth embodiment except for the following. FIG. 8 shows roller bearings 804A and 804B, which are not arranged on the most radial outward position of the stator 106 as roller bearings 706A and 706B. The roller bearings 706A and 706B are arranged at a perimeter of the stator 106. Instead, roller bearings 804A, 804B are arranged between the rotation axis 102 and the electromagnets 108. The roller bearings 804A, 804B are arranged radially inward of the electromagnets 108.

The advantage of this location is that the diameter of the rotor 112, 122 can be smaller, as no axles or roller bearings are placed outside the electromagnets 108. However, it might be necessary to improve stiffness of the rotor 112, 122 slightly, and it might be more difficult to fixate the axles 806A, 806B and roller bearing 804A, 804B to the stator 106. In a preferred solution of this embodiment the roller bearings 804A, 804B are placed in rectangular slots. A bore from the perimeter of the stator 106 in the direction of the rotation axis 102 intersecting the slot is used to place the axles 806A and 806B in the roller bearings 804A, 804B respectively, after which the electromagnets 108 are placed. The axles 806A, 806B are completely within the radius where the electromagnets 108 are placed.

As in the electric motor of FIG. 7, a variant with two, axially displaced, roller bearings are envisioned in the sixth embodiment. These roller bearings may be placed side-by-side or, as an alternative, slightly radially or tangentially displaced.

It is noted that, although FIGS. 7 and 8 illustrate the invention using two roller bearings, motors with only one roller bearing are foreseen, as well as motors with more than two roller bearings. Also motors with roller bearings in another orientation than vertical are part of the invention.

In an embodiment, the invention is provided according to one of the following clauses:

Clause 1: An electric motor/generator, showing a rotation axis, the motor/generator comprising a stator and a rotor, the stator showing an outer perimeter, the rotor at least enclosing the outer perimeter of the stator, the rotor rotatable around the rotation axis, the rotor and the stator separated by a first set of two axial air gaps, one air gap at each side of the stator, the rotor and/or stator damaged when any of the air gaps momentarily closes, characterized in that the stator shows one or more radial axles, each radial axle associated with one protective bearing, the inner ring of each protective bearing surrounding the associated axle, the protective bearing equipped with an outer ring having an outer diameter sufficiently large to avoid closure of at least one air gap when the rotor and/or the stator deforms due to external forces, thereby avoiding closure of the air gap and damage of the rotor and/or stator due to said external forces.

Clause 2: The electric motor/generator of clause 1 in which the one or more radial axles extend from the outer perimeter outward.

Clause 3: The electric motor/generator of clause 1 in which the stator is equipped with electromagnets positioned on a radius R, and the one or more radial axles are positioned between the rotation axis and the radius R on which the electromagnets are mounted.

Clause 4: The electric motor/generator of any of the preceding clauses in which the rotation axis is a horizontal axis and the rotor is a rotor in a vertical plane.

Clause 5: The electric motor/generator of clause 4 in which at least one axle is a vertical axle pointing to the horizontal axis.

Clause 6: The electric motor/generator of clause 4 in which the motor shows one or more non-vertical axles pointing to the horizontal axis.

Clause 7: The electric motor/generator of any of the preceding clauses in which the one or more protective bearings have an outer diameter that is sufficiently small that in normal conditions the one or more protective bearings do not contact the rotor, and thus do not increase friction in normal conditions.

Clause 8: The electric motor/generator of any of the preceding clauses in which the motor is an Axial Flux Permanent Magnet motor, the rotor comprising permanent magnets, the stator comprising electromagnets.

Clause 9: The electric motor/generator of any of the preceding clauses in which the electric motor is an in-wheel motor of a vehicle.

Clause 10: The electric motor/generator of any of clauses 1-8 in which the electric motor is part of a wind turbine.

Clause 11: The electric motor/generator of any of the preceding clauses in which the protective bearings are bearings from the group of ball bearings, needle bearings, and cam rollers.

In an embodiment, the invention is provided according to any of the following clauses.

Clause 12: An electric motor/generator comprising a stator and a rotor, the stator showing an outer perimeter, the rotor at least coaxially enclosing the outer perimeter of the stator, the rotor rotatable around a rotation axis, the rotor and the stator separated by a flux bearing gap over which in working magnetic flux occurs, the flux bearing gap damaged when the flux bearing gap momentarily closes, the motor/generator showing a protective gap, the protective gap during deformation of the rotor closing before the flux bearing gap closes, thereby avoiding closure of the flux bearing gap, characterized in that the stator comprises a roller bearing rotatable around an axle, the roller bearing comprising an inner bus and an outer bus, the protective gap located between the outer bus and the rotor, the protective gap open in normal use.

Clause 13: The motor/generator of clause 12 in which the axle is a radial axle.

Clause 14: The motor/generator of clause 13 in which the stator comprises electromagnets and the roller bearing is positioned between the rotation axis and the electromagnets.

Clause 15: The motor/generator of any of the preceding clauses 12-14 in which the rotation axis is a horizontal axis and the axle is a vertical axle pointing to the horizontal axis.

Clause 16: The motor/generator of clause 15 in which the roller bearing is at or close to the lowest position of the stator.

Clause 17: The motor/generator of any of clauses 12-14 in which the axle is a non-vertical axle pointing to the axis.

Clause 18: The motor/generator of any of the preceding clauses in which the axle is an axle parallel to the axis and the protective gap is a radial gap.

Clause 19: Vehicle equipped with a motor/generator according to any of the preceding clauses 12-18, more specifically an in-wheel motor/generator according to any of the preceding clauses 12-18.

Clause 20: Wind turbine equipped with a motor/generator according to any of clauses 12-18.

The invention claimed is:

1. An electric motor/generator comprising a stator and a rotor,
   wherein the stator has an outer perimeter,
   wherein the rotor at least coaxially encloses the outer perimeter of the stator,
   wherein the rotor is rotatable relative to the stator around a rotation axis,
   wherein the rotor and the stator are separated by a flux bearing gap over which in working magnetic flux occurs,
   wherein the rotor and the stator are separated by a protective gap,
   wherein the protective gap is configured to close, during a deformation of the rotor, before the flux bearing gap closes, thereby avoiding closure of the flux bearing gap,
   wherein the stator comprises a ball bearing or a roller bearing, and an axle, wherein the ball bearing or the roller bearing is coupled to the axle and rotatable around the axle,
   wherein the axle is arranged off-center from the rotation axis,
   wherein a distance between the ball bearing or the roller bearing and the rotor defines the protective gap.

2. The electric motor/generator of claim 1, wherein the axle is arranged radially relative to the rotation axis.

3. The electric motor/generator of claim 2, wherein the stator comprises electromagnets, and the ball bearing or the roller bearing is positioned between the rotation axis and the electromagnets.

4. The electric motor/generator of claim 1, wherein the axle extends radially from the outer perimeter.

5. The electric motor/generator of claim 1, wherein the protective gap is an axial gap.

6. The electric motor/generator of claim 1, wherein the rotation axis is a horizontal axis and the axle is perpendicular to the horizontal axis and pointing to the horizontal axis.

7. The electric motor/generator of claim 6, wherein the ball bearing or the roller bearing is at the lowest position of the stator.

8. The electric motor/generator of claim 1, wherein the axle is parallel to the rotation axis and the protective gap is a radial gap.

9. The electric motor/generator of claim 1, wherein the ball bearing or the roller bearing has an inner ring and an outer ring, wherein the inner ring is connected to the axle, wherein the outer ring has an outer lateral surface, wherein a distance between the outer lateral surface and the rotor defines the protective gap.

10. The electric motor/generator of claim 9, wherein the distance between the outer lateral surface and the rotor is in a radial direction relative to the axle.

11. The electric motor/generator of claim 1, comprising a plurality of ball bearings or roller bearings and a plurality of axles, wherein each of the plurality of ball bearings or roller bearings is rotatable around a corresponding one of the plurality of axles, wherein the plurality of axles are arranged on the stator to define a plurality of protective gaps, wherein, depending on the deformation of the roto, one or more of the plurality of protective gaps are configured to close.

12. The electric motor/generator of claim 1, wherein the roller bearing is a bearing from the group of needle bearings and cam rollers.

13. A vehicle equipped with the motor/generator according to claim 1.

14. A wind turbine equipped with the motor/generator according to claim 1.

* * * * *